United States Patent
Yang et al.

(10) Patent No.: US 6,192,243 B1
(45) Date of Patent: Feb. 20, 2001

(54) METHOD AND APPARATUS FOR DYNAMICALLY ADJUSTING NUMBER OF GUARD CHANNELS IN A MOBILE COMMUNICATION SYSTEM

(75) Inventors: Ping Yang; Hua Jiang, both of Plano, TX (US)

(73) Assignee: Nortel Networks Corporation, Montreal (CA)

(*) Notice: Under 35 U.S.C. 154(b), the term of this patent shall be extended for 0 days.

(21) Appl. No.: 08/855,936

(22) Filed: May 14, 1997

(51) Int. Cl.[7] .......................................................... A04Q 7/20
(52) U.S. Cl. .......................... 455/436; 455/439; 455/450; 455/440
(58) Field of Search ................................... 455/439, 450, 455/440, 446, 455, 436, 452, 464, 67, 451, 453, 561

(56) References Cited

U.S. PATENT DOCUMENTS

| | | | |
|---|---|---|---|
| 4,849,750 | * | 7/1989 | Andros et al. .................. 340/825.44 |
| 5,404,574 | * | 4/1995 | Beveniste ............................ 455/33.1 |
| 5,809,423 | * | 9/1998 | Benveniste ............................ 455/452 |
| 5,862,485 | * | 1/1999 | Linneweh, Jr. et al. ............. 455/450 |

FOREIGN PATENT DOCUMENTS 0701382   3/1996   (EP).

OTHER PUBLICATIONS

Yu O T W et al: Self–Tuning Prioritized Call Handling Mechanism With Dynamic Guard Channels for Mobile Cellular System' 1996 IEEE 46th. Vehicular Technology Conference, Mobile Technology for the Human Race Atlanta, Apr. 28–May 1, 1996, vol. 3, No. Conf. 46, Apr. 28, 1996, pp. 1520–1524, XP000595788 Institute of Electrical and Electronics Engineers. Cited in the application see the whole document.

Yu, et al "Self–Tuning Prioritized Call Handling Mechanism with synamic Guard Channels for Mobile Cellular Systems" IEEE./VTC Proceeding 1996.pp. 1520–1524.

Hong, et al "Traffic Model and Performance Analysis for Cellular Mobile Radio Telephone Systems with Prioritized and Nonprioritized Handoff Procedures" IEEE VT.35. No. 3, Aug. 1986,pp. 77–92.

* cited by examiner

*Primary Examiner*—Fan Tsang
*Assistant Examiner*—Sheila Smith
(74) *Attorney, Agent, or Firm*—Carr & Storm, L.L.P.

(57) ABSTRACT

A wireless communications systems for servicing mobile subscribers which dynamically optimizes the absolute number of channels reserved for use only as guard channels to minimize the blocking of handoff as well as new calls even under widely varying traffic and mobility conditions. This is accomplished by periodically first incorporating values, representative of traffic and mobility data typically collected in cellular systems, obtained over a given period of time, into an equation developed by the present inventors and calculating the number of guard channels needed to obtain assumed values of new and handoff call blocking; second changing the number of guard channels to the calculated value; and then third gathering data for a new period of time before returning to the first step.

10 Claims, 3 Drawing Sheets

METHOD AND APPARATUS FOR DYNAMICALLY ADJUSTING NUMBER OF GUARD CHANNELS IN A MOBILE COMMUNICATION SYSTEM

TECHNICAL FIELD

This invention pertains generally to wireless communications systems for servicing mobile subscribers, and in particular to minimizing the blocking of handoff calls generated or occurring as a result of subscribers moving from an adjacent cell to a given cell of a cellular network.

BACKGROUND

The most prevalent form of a mobile wireless communication system is a cellular network. In such a network, a territory serviced by it is divided into a plurality of geographically substantially distinct, but normally overlapping cells. Within each cell is a base station at which there is an antenna or antenna array connected to a bank of radio transmitters and receivers (hereinafter "radios") for communicating with mobile radios (phones) within the territory. These base stations are sometimes controlled by a base station controller (BSC). The base stations are connected through the base station controller by data and voice links to a mobile telecommunications switching office (MTSO) or mobile switching center (MSC). The MSC connects calls between two mobile radios within the network, between the mobile radios and the public switching telephone network ("PSTN") and occasionally between a mobile radio of that system and a radio of a foreign mobile system.

Each cell has assigned to it specific frequencies or channels on which mobile radios can operate. The channels are not the same as those assigned to immediately adjacent cells to prevent interference. Within each cell, there are normally at least two channels, called control channels, used to transmit data between mobile radios and the base station. This data is used for several purposes, including use by the MSC to signal a specific mobile radio as to which channels are to be used by that specific mobile radio for transmitting and receiving a specific call. As the specific mobile radio nears the edge of a cell, the weaker signal strength is noted by the base station and by the MSC, and arrangements are made, using prior art standardized techniques, to determine to which, of the one or more adjacent cells, the mobile radio is likely to pass. When the mobile radio passes into an adjacent cell, the MSC performs a "handoff" operation in which the MSC instructs the mobile radio to switch to new channels for communication with the base station of the next cell and, simultaneously, arranges for connecting the call through to the base station of the new cell and transmission on the new channels. Arrangements are also made with the base station of the cell that was just left by that radio to release the channels that were being using by the radio that was "handed off".

In a cellular system completing handoffs is critical. Generally, subscribers are very intolerant of dropped calls. To avoid dropping a call as a subscriber moves from one cell to the next, a cellular network must ensure that channels are always available for continuing the call. If there are not any available channels, the call is "blocked." Operators of cellular systems, therefore, effectively give higher priority to handoff calls than to new calls by reserving a certain number, of the total number of channels available to that cell, specifically for handling handoff calls. These reserved channels are typically designated in the industry as "guard" channels.

The grade of service for a trunk line or a cell has been estimated for many years using a well known "Erlang B" model and equation typically found in the form of a table. In other words the likelihood that a call, offered to a group of circuits, will fail to find an idle circuit on the first attempt (will be blocked). An example blocking probability might be 1.1% However, the Erlang B model or equation was developed for wireline service and does not take into account the mobility (handoffs/call) of the mobile radios within a cell. Thus, the Erlang B formula overestimates the traffic capacity of cellular networks by anywhere from 5% to 35% depending upon the number of channels in a cell and the mobility of subscribers to and from that cell. Consequently, the Erlang B formula cannot accurately or efficiently be used to determine the probability for handoff call blocking and thus, used to determine whether a given quantity of guard channels is appropriate. Prior art attempts, to use the Erlang B formula, have consistently overestimated the number of handoff guard channels required and thereby unduly limited the number of channels available for new calls in a given cell.

Unfortunately, the number of mobile phones, terminals or radios within any given cell and the call traffic can, in some cases, fluctuate dramatically during the course of the day. These fluctuations, if rapid, cannot be easily predicted or anticipated. This problem is exacerbated as cell sizes become smaller to accommodate increased numbers of subscribers in a communication area or network. It will be readily apparent to anyone skilled in the art that smaller cells will require more handoffs. Also, any changes in mobility patterns and subscriber mobility will more drastically affect the blocking probability of any calls, whether new or handoff, when cell sizes become smaller.

One prior art article attacks the mobility problem using priority schemes. The article is entitled "Traffic Model and Performance Analysis for Cellular Mobile Radio Telephone Systems with Prioritized and Non prioritized Handoff Procedures" and authored by D. Hong and S. S. Rappaport in Transactions on Vehicular Technology V-35, No. 3, published August 1986 page 77–92. The problem of changing traffic loads has also been recognized by various previous authors. An attempt to provide dynamic alteration of the number of guard channels is discussed in a 1996 IEEE/VTC Proceedings article entitled "Self-Tuning Prioritized Call Handling Mechanism with Dynamic Guard Channels for Mobile Cellular Systems" by Oliver T. W. Yu and Victor C. M. Leung, page 1520. This system utilizes measured current traffic information obtained from adjacent cells to estimate the amount of handoff traffic that is likely to occur in the present cell and the number of guard channels is adjusted in accordance with an algorithm given and explained in the article. This system has an attendant disadvantage of control signaling overhead to obtain the required adjacent traffic information.

SUMMARY OF THE INVENTION

When using the algorithm presented as part of the present invention, an optimum number of guard channels for any given cell in a cellular communications network can be determined based on measurable parameters indicative of the mobility of subscribers within the cell and call traffic within that cell. Mobility is measured by the number of handoffs per call. Data for determining call traffic and number of handoffs per call is easily tracked by most cellular networks. Thus, no additional measurements or cell-to-cell control signal overhead transmissions of traffic data are necessary. By periodically measuring mobility and traffic load parameters pertaining to a given cell, the present invention enables the calculation of an optimum number of guard channels for a predetermined grade of service for handoff calls occurring in that cell. This calculation may be determined in "pseudo real time," and the actual number of channels reserved for handoffs for a given cell may be dynamically and automatically altered throughout the day in response to changes in mobility and traffic loads in order to individually optimize the number of guard channels in each cell of the communication network controlled by the MSC.

DETAILED DESCRIPTION

Figure 1:
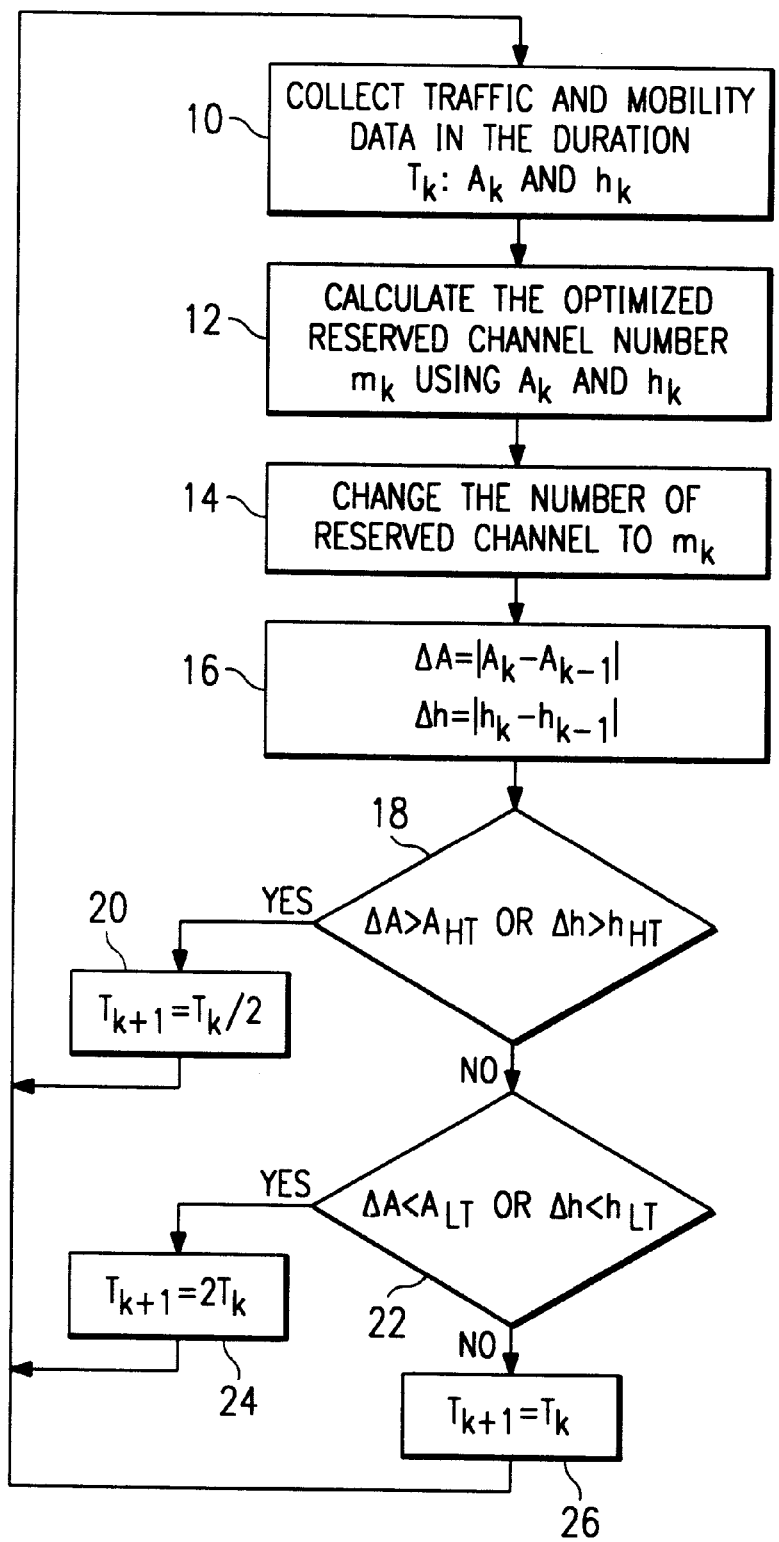
FIG. 1 is a flow diagram for explaining an algorithm which implements an embodiment of the present invention.

FIG. 1 represents a flow diagram which may be used to write a computer program to implement the dynamic guard channel algorithm utilized in an embodiment of the present invention. In this figure, block 10 represents a time interval "$T_k$" during which traffic "A" and mobility "h" data are collected for a given cell. In this explanation, k is the present time interval, k−1 represents the previous data collection time interval and k+1 represents the next data collection time interval. In block 12 an optimum number of guard channels "m" is iteratively calculated using formulas set forth in connection with the discussion of FIG. 5. This discussion provides more details as to the calculation process used obtaining an optimum number of guard channels. In block 14 the number of reserved or guard channels, used in the specific cell site for which data was collected, is changed to the newly calculated $m_k$ value, if different from the $m_{k-1}$ value. The values ΔA and Δh, indicate the absolute value changes in traffic and mobility respectively, from a previous calculation in block 12 and are determined in block 16. In decision block 18, $A_{HT}$ and $h_{HT}$ represent predetermined set upper threshold values of traffic and mobility changes.

If, in decision block 18, either ΔA or Δh exceed $A_{HT}$ or $h_{HT}$, respectively, it is desirable that the changes in traffic be tracked or followed more closely. Thus, in block 20, the time until the next $m_k$ calculation in block 12 is halved. If decision block 18 results in a "NO", decision block 22 determines if either ΔA or Δh is less than $A_{LT}$ or $h_{LT}$ where $A_{LT}$ and $h_{LT}$ represent predetermined set lower threshold values of traffic and mobility changes respectively. If decision block 18 results in a "YES", the change was significantly less than an average change and, thus, the time duration of data collection before the next calculation in block 12 may be increased to twice the last used value as illustrated in block 24. If both decision blocks 18 and 22 result in a "NO", the time duration of data collection is maintained in decision block 26. Although one-half and doubling were utilized in blocks 20 and 24, these changes in data collection times are arbitrary and are merely illustrative of the fact that the time until another calculation is made may be changed to conserve system resources. If the computation is accomplished within the cell site, the computer would have more time to proceed with other normal processes during the times that decision block 22 indicates "YES". If the computation is accomplished outside the cell site such as in the base station controller, the overhead traffic to the cell site may be reduced.

Figure 2:
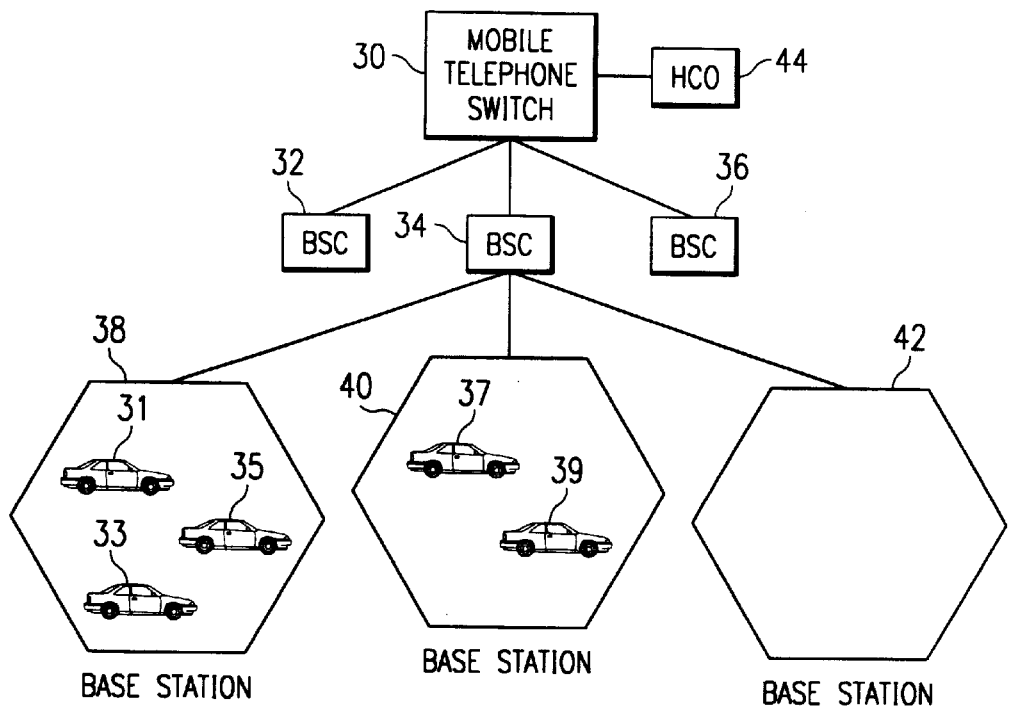
FIG. 2 is a block diagram schematic of a mobile communication system, including a main switch and a plurality of cells with a single handoff channel optimizer for the system incorporated in the main switch.
Figure 3:
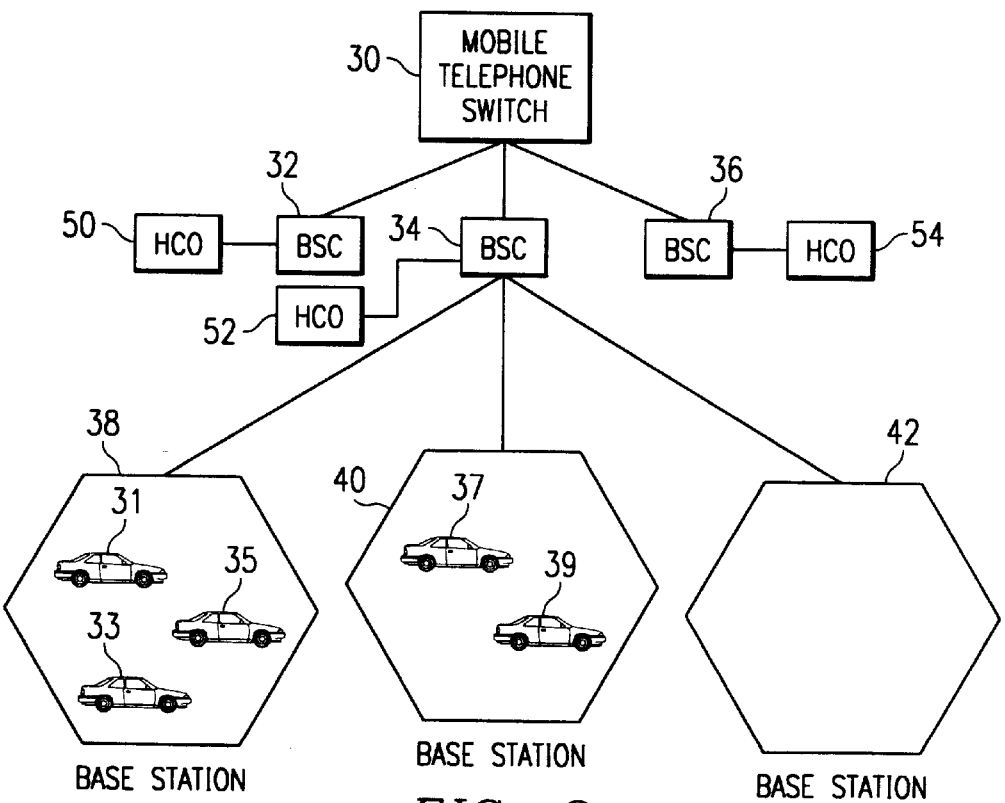
FIG. 3 is a block diagram schematic which implements a mobile communication system in which the handoff channel optimizer function is incorporated in each of the base station controllers.
Figure 4:
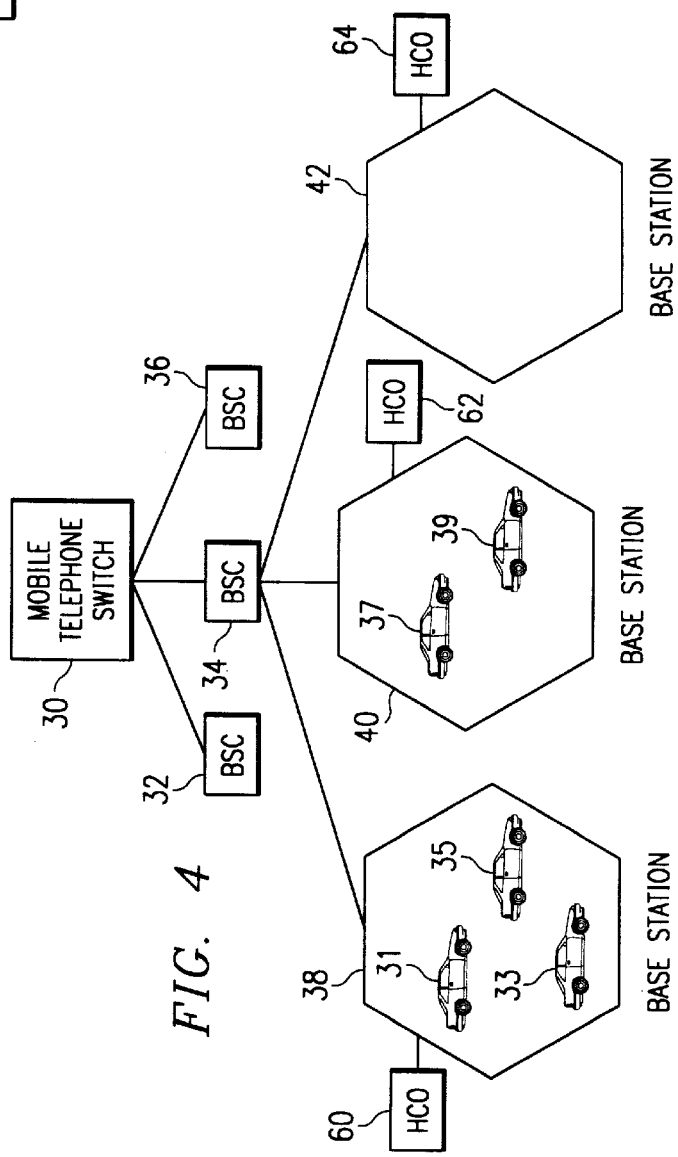
FIG. 4 is a block diagram schematic which implements a mobile communication system in which the handoff channel optimizer function is incorporated in each of the base stations, thereby eliminating overhead traffic requirements in the communications between the main switch or the controllers to the individual base stations.

Each of FIGS. 2, 3 and 4 comprise a mobile telecommunications switching office, mobile telephone switch or other centralized switching apparatus 30 coupled to a plurality of base switch controllers (BSC) 32, 34 and 36. As will be realized, a single mobile telephone switch 30 may have many additional base switch controllers beyond those illustrated. Each of the base switch controllers manages or oversees a plurality of cells. As an example, base switch controller 34 is illustrated coupled to a plurality of base stations 38, 40 and 42, each of which describes or covers a geographical area within the total cellular communication network of the mobile telephone switch 30. Typically each of the cells managed by a single BSC, such as BSC 34 are adjacent to one or more other cells managed by that BSC.

In FIG. 2 a handoff channel optimizer (HCO) or computer 44 is illustrated coupled to the mobile telephone switch 30. In such an instance, HCO 44 gathers data from the remotely located cells, such as 38, 40 and 42 using existing overhead channel communication lines presently in existence for obtaining and keeping track of this information. HCO 44 then makes the calculations and decisions set fourth in blocks 12–26 of FIG. 1 for each one of the remote cells. The new setting for a number of guard channels information is then transmitted to that cell. Within cell 38 mobile cellular customers having radio phones are illustrated as vehicles 31, 33 and 35. As shown, vehicle 35 is about to leave cell 38 and enter to influence of cell 40. While cell 40 is illustrated with two additional customers 37 and 39. Although not illustrated as such, it should be apparent and understood that each of the cells has overlapping signal or communication coverage with adjoining or adjacent cells in accordance with standard practice.

FIG. 3 illustrates a second embodiment of the present invention in which a HCO 50 is coupled to base station controller 32, another HCO 52 is coupled to base station controller 34 while a final HCO 54 is shown coupled to base station controller 36. HCO's 50, 52 and 54 make the calculations and decisions set fourth in blocks 12–26 of FIG. 1 for the remote cells associated with the BSC to which it is coupled. The new setting for a number of guard channels information is then transmitted to that cell. Each of these HCOs tracks and optimizes only the cell traffic of the base stations coupled to the corresponding base station controller. This reduces a number of computations a given HCO must perform and also reduces the overhead traffic load imparted on mobile telephone switch 30.

FIG. 4 presents a third embodiment of the present invention wherein an HCO is incorporated in each of the plurality of base stations. As illustrated in FIG. 4, an HCO 60 is coupled to base station 38, while additional HCOs 62 and 64 are coupled to base stations 40 and 42, respectively.

Figure 5:
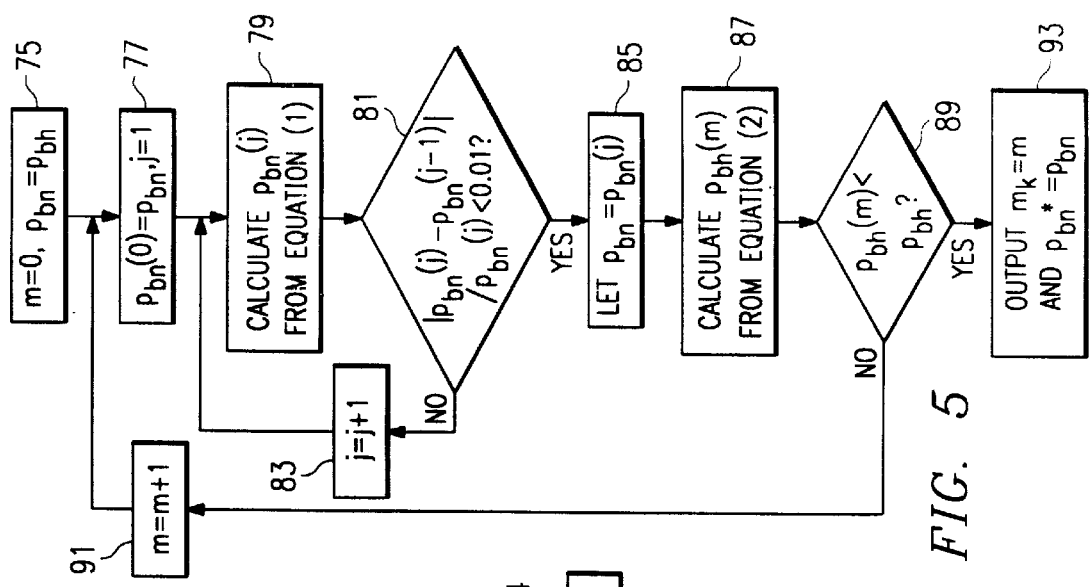
FIG. 5 is a flow diagram for explaining the calculation occurring in block 12 of FIG. 1.

FIG. 5 represents a flow diagram which may be used to write a computer program to implement the calculations of block 12 of FIG. 1. The traffic in Erlangs is a given value obtained by measurements and is represented by "$A_k$". The handoff blocking probability is a given objective value and is represented by "$p_{bh}$". The total number of channels in each cell is represented by "n" and is also a given value. The mobility of the radios in the cell is represented by "$h_k$" and is expressed in terms of number of handoffs per call. The object of the calculation is to obtain an optimized value for $m_k$ by solving iteratively the equation for "$p_{bn}$" as set forth below $$p_{bn}^{(j)} = \left\{ \sum_{i=(n-m)}^{n} \left( \frac{A_k^i}{i!} \right) \left( \frac{(1+h_k(1+p_{bh}-p_{bn}^{(j-1)}))}{(1+h_k)(1+h_k \cdot p_{bh})} \right)^{(n-m)} \right. \quad \text{Equation (1)}$$

$$\left. \left( \frac{(1-p_{bn}^{(j-1)})h_k}{(1+h_k)(1+h_k \cdot p_{bh})} \right)^{(i-n+m)} \right\} P_0$$

Where $$P_0 = \left\{ \sum_{i=0}^{(n-m)} \left( \frac{A_k^i}{i!} \right) \left( \frac{(1+h_k(1+p_{bh}-p_{bn}^{(j-1)}))}{(1+h_k)(1+h_k \cdot p_{bh})} \right)^i - \right\} + X_1 \right\}^{-1}$$

And Where $$X_1 = \sum_{i=(n-m+1)}^{n} \left( \frac{A_k^i}{i!} \right)$$

$$\left( \frac{(1+h_k(1+p_{bh}-p_{bn}^{(j-1)}))}{(1+h_k)(1+h_k \cdot p_{bh})} \right)^{(n-m)} \left( \frac{(1-p_{bn}^{(j-1)})h_k}{(1+h_k)(1+h_k \cdot p_{bh})} \right)^{i-(n-m)}$$

In the above equation, "$p_{bn}$" (new call blocking) is initially set to a blocking probability value equal to the given "$p_{bh}$" (handoff blocking), "m" (number of guard channels) is set to 0 in block 75. For the first iteration in block 77, $p_{bn}^{(0)}$ is set to the same value as the last set value of $p_{bn}$, and j is set to 1. In block 79 the steps are taken to solve for $p_{bn}^{(j)}$. In decision block 81, the absolute value of $\{p_{bn}^{(j)} - p_{bn}^{(j-1)}\}$ divided by $p_{bn}^{(j)}$ is checked to see if it is less than some predetermined error value such as 0.01. If it is not, the process continues to block 83 to increment "j". This process is repeated using the just obtained values for "$p_{bn}$" until the absolute value difference between successively obtained values of "$p_{bn}$" is less than the predetermined error value.

At this point, the process proceeds to block 85 where "$p_{bn}$" is set equal to the last obtained value of new call blocking probability "$p_{bn}^{(j)}$". The process continues on to block 87 where $p_{bh}(m)$ (handoff blocking probability for the last set number of guard channels) is calculated from equation 2 below.

$$p_{bh}(m) = \left\{ \left( \frac{A_k^n}{n!} \right) \left( \frac{(1+h_k(1+p_{bh}-p_{bn}))}{(1+h_k)(1+h_k \cdot p_{bh})} \right)^{(n-m)} \quad \text{Equation (2)} \right.$$

$$\left. \left( \frac{(1-p_{bn})h_k}{(1+h_k)(1+h_k \cdot p_{bh})} \right)^m \right\} P_1$$

Where $$P_1 = \left\{ \sum_{i=0}^{(n-m)} \left( \frac{A_k^i}{i!} \right) \left( \frac{(1+h_k(1+p_{bh}-p_{bn}))}{(1+h_k)(1+h_k \cdot p_{bh})} \right)^i - \right\} + X_2 \right\}^{-1}$$

And Where $$X_2 = \sum_{i=(n-m+1)}^{n} \left( \frac{A_k^i}{i!} \right)$$

$$\left( \frac{(1+h_k(1+p_{bh}-p_{bn}))}{(1+h_k)(1+h_k \cdot p_{bh})} \right)^{(n-m)} \left( \frac{(1-p_{bn})h_k}{(1+h_k)(1+h_k \cdot p_{bh})} \right)^{i-(n-m)}$$

After $p_{bh}(m)$ is calculated, the process proceeds to decision block 89 where the calculated result $p_{bh}(m)$ is compared to the initially assumed or predetermined value of handoff blocking probability $p_{bh}$. If it is greater than $p_{bh}$, the process increments "m" in block 91 and the calculations of blocks 79 and 87 are repeated using the incremented value of "m" and the last value of $p_{bn}$ as set in block 85. If, however, decision block 89 determines that the optimized number of guard channels has been determined, because $p_{bh}(m)$ is equal to or less than the originally set value of $p_{bh}$, the process go to block 93 where $m_k$ is set to "m" and $p_{bn}^*$ is set to the last calculated value of $p_{bn}$. The process can then proceed to block 14 of FIG. 1.

OPERATION

While the operation of this concept should be reasonably apparent from the Background, Summary of Invention and Detailed Description provided above, a summarization will be provided herein.

Cellular communication systems are typically configured with a plurality of cell sites, each incorporating a base station such as the base stations 38–42 in the FIGS. 2–4 and each providing radio wave coverage to a given geographical area described as a cell. Depending upon the size of the communication network, there may not be separate base station controllers such as 32–36. In any event, there is always a master switch represented as mobile telephone switch 30 which provides communication between wire line public telephone networks or other "foreign" communication systems and the individual cell sites. As previously mentioned, the problem of handoffs does not occur in wire line communication networks since a wire is always physically coupled to the same switch and, in spite of cordless phones, there is no user mobility such as that presented in the cellular phone environment. However, with cellular phones, there is the capability of a phone moving from the home cell to an adjacent cell. When that occurs, the communication link is broken if it cannot be transferred. Because customers are much more tolerant of having a new call blocked than they are of having an existing call be interrupted, considerable research has been expended in attempting to make sure that a majority of calls are transferred as a customer is moving from one cell to an adjoining cell without the customer even being aware of the handoff. Many prior art systems have reserved a given number of channels to be used only for handoff calls as opposed to new calls. As will be realized, the call blocking concept does not come into play when there is very light traffic, or, in other words, when less than the total number of channels available to that cell, minus guard channels, are being utilized.

To reiterate in slightly different terminology, it may be assumed that the total number of channels is "n" and the number of guard channels is "m". If a call is to be established and there are less than (n−m) calls in progress in the cell, the call to be originated (whether it be a new call to or from the cell or a handoff call) is assigned an available channel. However, if there are already at least (n−m) calls in progress at the time a setup communication is received from the mobile telephone switch 30, the incoming call will be established only if it is a handoff call from an adjacent cell. If a call request is received from the main telephone switch 30 when all "n" channels are being used, this request will be blocked whether it is a new call or a handoff call. However, it should be realized that the chance or probability of blocking a handoff call is much smaller than that of blocking a new call if the base station refuses to accept any more new calls, whenever more than (n−m) communications are already in progress. Thus, the probability of blocking a new call is much higher than handoff blocking. Typical assumptions in the industry require that the system be designed such that new call blocking is kept at approximately or no more than 1%, whereas handoff blocking is kept at a value of no more than 0.1%.

A problem with prior art approaches to solving the problem of establishing the correct number of guard channels is that traffic and mobility are not constant throughout a day. If a cell has a very large value of guard channels "m" as compared to total channels "n", only a few customers can originate new calls at any given time. If the number of guard cells "m" is very small compared with the total channels "n", the probability of handoff call blocking is larger than the desired rate of 0.1%. Such a situation would occur if the cell included a freeway and there was a large amount of mobility within a cell. It has been noted that when freeways are clogged during rush hour, the number of people using cellular phones is greatly increased over the use which occurs in normally moving traffic.

From the above discussion, it will be apparent that it is highly desirable to dynamically adjust the number of channels reserved for handoff calls such that only a small number of handoffs are blocked while still providing an optimum value of new call blocking during typical traffic conditions.

As is known in the prior art, and as may be ascertained from many textbooks, such as *Mobile Cellular Communications, Second Edition*, authored by William C. Y. Lee and published by McGraw Hill, Inc. in 1995, the handoff of a call from one cell, such as cell 38, to cell 40 involves communication from base station 38 to base station controller 34 indicating that the power of the signal received at a given subscriber phone has dropped to a level such that said phone should be picked up by a base station of an adjoining cell. A query is sent to other adjacent cells. If another cell is found which has a higher signal strength from that phone, appropriate overhead information will be sent as to channels, etc. for that cell to take over communications with the given subscriber. Accordingly, a channel is released for further use by another call, whether it be a newly originated call or a handoff subscriber moving From the discussion supra, it will be apparent that the algorithm outlined in the flow diagrams of FIGS. 1 & 5 is a useful concept in ascertaining the optimum number of total available channels to be reserved as guard channels for handoff communications. Because the logic illustrated in FIGS. 1 & 5 is believed adequately detailed in the Detailed Description, no further comment will be made other than to indicate that while the time for collecting traffic and mobility data is altered by a factor of two either up or down as presented in FIG. 1, the change in traffic collection time is merely inserted to even further optimize the algorithm and is not required to obtain a useable system. The alteration of the time in which traffic and mobility data is collected merely enhances either the ability of the system to cope with suddenly increased mobility or the ability of the system to be free from excessive use of overhead communications to the various cell sites and/or use of the HCO when the computer power incorporating this optimization algorithm could be more beneficially used for other tasks.

While this explanation has been provided using the assumption that some computer power would be programmed to provide the HCO function, in some implementations it may be desirable to have dedicated circuitry performing this function and in such a situation there would be less benefit in increasing the time between calculations as provided by block 24. However, if the block 24 were eliminated, there would still be the necessity of returning the data collection periods to a normal or standard time period when the data collected indicates that more normal traffic and mobility situations are encountered.

Although the present invention has been described in the context of a circuit switched cellular system used predominantly to transmit voice, mobile data transmission networks, including packet switched networks, can be set up using cellular structure. The principles of this invention are equally applicable to such networks.

A single overall cellular network has been illustrated with the HCO function incorporated in various locations within the system and engendering various communication problems and advantages in the various implementations illustrated in FIGS. 2–4. However, the concept of dynamically adjusting an absolute number of channels reserved for handoff calls in accordance with existing traffic and mobility data normally collected by a wireless communication system may be used in many other configurations of a wireless system. Accordingly, we wish to be limited not by the present flow diagram or implementations shown, but only by the scope of the concept as presented in the appended claims.

What is claimed is:

1. A method for determining an optimum number of guard channels reserved in a cell of a cellular communications system for handoff calls in order to achieve a predetermined handoff call blocking probability, the method comprising the steps of:

a. measuring traffic load of the cell for a predetermined time interval;

b. measuring the number of handoffs per call in the cell during the predetermined time interval;

c. determining an optimum number of guard channels reserved for handoff calls in the cell based on traffic load and mobility for the cell in order to achieve the predetermined handoff call blocking probability, by:

setting a value for new call blocking probability ($p_{bn}$) to a blocking probability value equal to a given handoff blocking ($p_{bh}$);

setting a number of guard channels (m) to zero;

setting $p_{bn}^{(0)}$ to the same value as a previously set value of $p_{bn}$. and setting a counter j to 1;

solving for $p_{bn}^{(j)}$;

determining whether the absolute value of $\{p_{bn}^{(j)} - p_{bn}^{(j-1)}\}$ divided by $p_{bn}^{(j)}$ is less than a predetermined error value;

responsive to a determination that the absolute value of $\{p_{bn}^{(j)} - p_{bn}^{(j-1)}\}$ divided by $p_{bn}^{(j)}$ is not less than the predetermined error value, incrementing j and repeating the steps of solving for $p_{bn}^{(j)}$ and checking the absolute value until the absolute value difference between successively obtained values of $p_{bn}$ is less than the predetermined error value;

responsive to a determination that the absolute value of $\{p_{bn}^{(j)} - p_{bn}^{(j-1)}\}$ divided by $p_{bn}^{(j)}$ is less than the predetermined error value, setting pbn equal to the last obtained value of new call blocking probability $p_{bn}^{(j)}$;

calculating a handoff blocking probability ($p_{bh}$(m)) for a previous set number of guard channels;

determining whether the calculated result $p_{bh}$(m) is greater than the initially predetermined value of handoff blocking probability $p_{bh}$;

responsive to a determination that $p_{bh}$(m) is greater than $p_{bh}$, incrementing m and returning to the step of setting $p_{bn}^{(0)}$; and responsive to a determination that $p_{bh}$(m) is less than or equal to $p_{bh}$, setting the optimum number of guard channels equal to m and setting the call blocking probability to the last calculated value of $p_{bn}$; and d. adjusting the number of guard channels reserved for handoff calls in the cell to a value corresponding to the optimum number of guard channels reserved for handoff calls determined in the previous step.

2. The method of claim 1 wherein the step of calculating a handoff blocking probability ($p_{bh}$(m)) for a previous set number of guard channels is calculated as:

$$P_1 = \left\{ \sum_{i=0}^{(n-m)} \left(\frac{A_k^i}{i!}\right) \left(\frac{(1 + h_k(1 + p_{bh}\ p_{bn}))}{(1 + h_k)(1 + h_k \cdot p_{bh})} - \right)^i + X_2 \right\}^{-1}$$

where $$p_{bh}(m) = \left\{ \left(\frac{A_k^n}{n!}\right) \left(\frac{(1 + h_k(1 + p_{bh}\ p_{bn}))}{(1 + h_k)(1 + h_k \cdot p_{bh})}\right)^{(n\ m)} \left(\frac{(1\ p_{bn})h_k}{(1 + h_k)(1 + h_k \cdot p_{bh})}\right)^m \right\} P_1$$

and where $$X_2 = \sum_{i=(nm+1)}^{n} \left(\frac{A_k^i}{i!}\right) \left(\frac{(1 + h_k(1 + p_{bh}\ p_{bn}))}{(1 + h_k)(1 + h_k \cdot p_{bh})}\right)^{(n\ m)} \left(\frac{(1\ p_{bn})h_k}{(1 + h_k)(1 + h_k \cdot p_{bh})}\right)^{i\ (n\ m)}.$$

3. The method of claim 1 wherein the predetermined error value is set to about 0.01.

4. A method for determining an optimum number of channels reserved in a cell of a cellular communications system for handoff calls in order to achieve a predetermined handoff call blocking probability, the method comprising:

measuring a first traffic load value of the cell for a first predetermined time interval;

measuring a first mobility value of mobile radios in the cell during the first predetermined time interval;

determining a first optimum number of guard channels reserved for handoff calls in the cell based on first traffic load value and the first mobility value for the cell in order to achieve the predetermined handoff call blocking probability;

measuring a second traffic load value of the cell for a second predetermined time interval;

measuring a second mobility value of mobile radios in the cell during the second predetermined time interval;

determining a second optimum number of guard channels reserved for handoff calls in the cell based on second traffic load value and the second mobility value for the cell in order to achieve the second predetermined handoff call blocking probability;

adjusting the number of guard channels reserved for handoff calls in the cell to a value corresponding to the second determined optimum number of guard channels reserved for handoff calls;

determining a differential traffic value as the difference between the first traffic value and the second traffic value;

determining a differential mobility value as the difference between the first mobility value and the second mobility value;

determining whether either the differential traffic value is greater than a predetermined set upper threshold value of differential traffic value or the differential mobility value is greater than a predetermined set upper threshold values of differential mobility value;

in response to a determination that either the differential traffic value is greater than a predetermined set upper threshold value of differential traffic value or the differential mobility value is greater than a predetermined set upper threshold value of differential mobility value, setting a third predetermined time interval equal to the second predetermined time interval divided by a first constant greater than one;

in response to a determination that neither the differential traffic value is greater than a predetermined set upper threshold values of differential traffic value nor the differential mobility value is greater than a predetermined set upper threshold values of differential mobility value, determining whether either the differential traffic value is less than a predetermined set lower threshold values of differential traffic value or the differential mobility value is less than a predetermined set lower threshold values of differential mobility value;

in response to a determination that either the differential traffic value is less than a predetermined set lower threshold value of differential traffic value or the differential mobility value is less than a predetermined set lower threshold value of differential mobility value, setting a third predetermined time interval equal to the second predetermined time interval multiplied by a second constant greater than one;

in response to a determination that neither the differential traffic value is less than a predetermined set lower threshold value of differential traffic value nor the differential mobility value is less than a predetermined set lower threshold value of differential mobility value, setting a third predetermined time interval equal to the second predetermined time interval;

measuring a third traffic load value of the cell for the third predetermined time interval;

measuring a third mobility value of mobile radios in the cell during the third predetermined time interval;

determining a third optimum number of guard channels reserved for handoff calls in the cell based on third traffic load value and the third mobility value for the cell in order to achieve the predetermined handoff call blocking probability; and adjusting the number of guard channels reserved for handoff calls in the cell to a value corresponding to the third determined optimum number of guard channels reserved for handoff calls.

5. The method of claim 4 wherein the first constant and the second constant are the integer 2.

6. The method of claim 4 wherein the mobility of mobile radios is measured by a number of handoffs per call.

7. The method of claim 4 wherein the measuring of traffic load and mobility of mobile radios and the determining of the optimum number of guard channels is made periodically, and wherein the adjusting of the number of guard channels in the cell includes automatically adjusting the number of guard channels in response a change in the calculated number of guard channels.

8. The method of claim 4 wherein the steps of determining a first optimum number of guard channels, determining a second optimum number of guard channels, and determining a third optimum number of guard channels, is each performed by the steps of:

setting a value for new call blocking probability ($p_{bn}$) to a blocking probability value equal to a given handoff blocking ($p_{bh}$);

setting a number of guard channels (m) to zero;

setting $p_{bn}^{(0)}$ to the same value as a previously set value of $p_{bn}$, and setting a counter j to 1;

solving for $p_{bn}^{(j)}$;

determining whether the absolute value of $\{p_{bn}^{(j)}-p_{bn}^{(j-1)}\}$ divided by $p_{bn}^{(j)}$ is less than a predetermined error value;

responsive to a determination that the absolute value of $\{p_{bn}^{(j)}-p_{bn}^{(j-1)}\}$ divided by $p_{bn}^{(j)}$ is not less than the predetermined error value, incrementing j and repeating the steps of solving for $p_{bn}^{(j)}$ and checking the absolute value until the absolute value difference between successively obtained values of $p_{bn}$ is less than the predetermined error value;

responsive to a determination that the absolute value of $\{p_{bn}^{(j)}-p_{bn}^{(j-1)}\}$ divided by $p_{bn}^{(j)}$ is less than the predetermined error value, setting $p_{bn}$ equal to the last obtained value of new call blocking probability $p_{bn}^{(j)}$;

calculating a handoff blocking probability ($p_{bh}(m)$) for a previous set number of guard channels;

determining whether the calculated result $p_{bh}(m)$ is greater than the initially predetermined value of handoff blocking probability $p_{bh}$; responsive to a determination that $p_{bh}(m)$ is greater than $p_{bh}$, incrementing m and returning to the step of setting $p_{bn}^{(0)}$; and responsive to a determination that $p_{bh}(m)$ is less than or equal to $p_{bh}$, setting the optimum number of guard channels equal to m and setting the call blocking probability to the last calculated value of $p_{bn}$.

9. The method of claim 4 wherein the step of calculating a handoff blocking probability ($p_{bh}(m)$) for a previous set number of guard channels is calculated as:

$$P_1 = \left\{ \sum_{i=0}^{(n-m)} \left(\frac{A_k^i}{i!}\right)\left(\frac{(1+h_k(1+p_{bh}\ p_{bn}))}{(1+h_k)(1+h_k \cdot p_{bh})} - \right)^i + X_2 \right\}^{-1}$$

where $$p_{bh}(m) = \left\{ \left(\frac{A_k^n}{n!}\right)\left(\frac{(1+h_k(1+p_{bh}\ p_{bn}))}{(1+h_k)(1+h_k \cdot p_{bh})}\right)^{(n\ m)} \left(\frac{(1\ p_{bn})h_k}{(1+h_k)(1+h_k \cdot p_{bh})}\right)^m \right\} P_1$$

and where $$X_2 = \sum_{i=(nm+1)}^{n} \left(\frac{A_k^i}{i!}\right)\left(\frac{(1+h_k(1+p_{bh}\ p_{bn}))}{(1+h_k)(1+h_k \cdot p_{bh})}\right)^{(n\ m)} \left(\frac{(1\ p_{bn})h_k}{(1+h_k)(1+h_k \cdot p_{bh})}\right)^{i\ (n\ m)}.$$

10. The method of claim 4 wherein the predetermined error value is set to about 0.01.

* * * * *